United States Patent [19]

Tissot

[11] 4,245,797
[45] Jan. 20, 1981

[54] FISHING REELS

[75] Inventor: Guy Tissot, Annecy, France

[73] Assignee: Mitchell S.A., France

[21] Appl. No.: 1,424

[22] Filed: Jan. 8, 1979

[30] Foreign Application Priority Data

Jan. 20, 1978 [FR] France .................................. 78 02811

[51] Int. Cl.³ ............................................. A01K 89/01
[52] U.S. Cl. ................................................ 242/84.2 G
[58] Field of Search ..................... 242/84.2 G, 84.2 F, 242/84.21 R

[56] References Cited

U.S. PATENT DOCUMENTS

| | | | |
|---|---|---|---|
| 3,586,255 | 6/1971 | Monthulet | 242/84.21 R |
| 3,627,223 | 12/1971 | Monthulet | 242/84.2 G |
| 4,095,756 | 6/1978 | Morishita | 242/84.2 G |
| 4,098,472 | 7/1978 | Sazaki | 242/84.2 G |
| 4,109,880 | 9/1978 | Yamasaki et al. | 242/84.21 R |

*Primary Examiner*—Billy S. Taylor
*Attorney, Agent, or Firm*—Robert E. Burns; Emmanuel J. Lobato; Bruce L. Adams

[57] ABSTRACT

A fishing reel of the type in which the spool does not rotate, comprises a drum rotatable about the axis of the spool. A support arm projects forwardly from the outer end of each of two securing arms projecting from opposite sides of the drum. Pick-up arms pivotally mounted on the support arms are interconnected by a pick-up bar and are spring biased to move angularly from "open" to "closed" position. On one of the support arms, a spring-pressed longitudinally slidable plunger is engageable in a notch of the respective pick-up arm to lock it in "open" position. In the respective securing arm there is a shaft having on its inner end an arm that is engageable with a fixed stop, when the drum is rotated, to rock the shaft. A pin and slot connection on the outer end of the shaft connects the shaft with the plunger so as to withdraw the plunger from the notch of the respective pick-up arm and thereby release the pick-up arms for movement by the spring bias to "closed" position. Rocking of the shaft also releases a drum brake. A further arm on the shaft provides for manual release of the pick-up arms without rotation of the drum.

8 Claims, 8 Drawing Figures

FISHING REELS

FIELD OF INVENTION

The present invention relates to a fishing reel, of the type comprising a drum which is mounted to rotate, at least one support arm located in the vicinity of the drum along the latter and connected to the rear part of the periphery of this drum by a securing arm extending from said rear part, a spool which is not able to rotate and is located concentrically with respect to the drum and in front of the latter, the skirt of which surrounds the periphery of the drum and passes between this periphery and the support arm, a pick-up arm mounted to rotate on the free end of the support arm and able to occupy a first "closed" angular position and a second "open" angular position, this pick-up arm being subject to the action of elastically yieldable means constantly tending to keep the pick-up arm in its first "closed" position, an elastically yieldable locking device keeping the pick-up arm locked in its second angular position and kinematically connected to an unlocking device, whereof a part which is housed in the drum, is intended to co-operate, during the rotation of the drum, with a fixed stop located behind the spool, in the trajectory of said part of the unlocking device, this locking device being constituted by a sliding plunger located longitudinally inside the support arm, one end of which plunger, under the action of elastically yieldable means, tends to be housed in a notch in the periphery of the pick-up arm when the latter occupies its second "open" position, the pick-up arm comprising, on one side of the notch, a ramp inclined in a direction tending to cause the plunger to withdraw, against the action of the elastically yieldable means of the latter, when the end of this plunger is disengaged from the notch and the pick-up arm passes from its second to its first position.

BACKGROUND OF THE INVENTION

Reels of this type are described in U.S. Pat. Nos. 4,098,473 and 4,109,880. In these reels, fixed stops push the L-shaped sliding plunger directly backwards. The travel of this plunger thus depends on the depth of the securing arm which should consequently be relatively deep.

SUMMARY OF THE INVENTION

The purpose of the invention is to reduce the depth of the securing arm and consequently the volume and above all the weight of the reel and to increase the rigidity of the securing arm.

The reel according to the invention is characterised by the fact that the unlocking device is constituted by a shaft arranged transversely with respect to the axis of rotation of the drum, in the securing arm, which is able to move angularly inside the latter and supporting, at a first end, inside the drum, a first transverse arm whose free end is intended to co-operate with the fixed stop and at its second end, opposite the first, a second transverse arm comprising either an oblong slot arranged longitudinally in which is housed a lug integral with the sliding plunger, or a lug housed in an oblong slot located transversely in the sliding plunger.

Since the fixed stop acts on an intermediate shaft itself acting on the sliding plunger, it is henceforth sufficient that the depth of the securing arm makes it possible to house the pivot shaft. The depth of the securing arm is thus independent of the travel of the plunger and can be reduced with respect to the prior art.

According to one embodiment, the first transverse arm of the unlocking device comprises a part in relief which is intended to co-operate with a drum brake which can be actuated at least approximately parallel to the axis of the drum.

According to another embodiment, according to each individual case, the lug provided on the sliding plunger of the locking device or on the second transverse arm of the unlocking device comprises an axial tension projecting laterally beyond the support arm through an opening provided in this support arm. According to another embodiment, the shaft of the unlocking device, located in the securing arm, comprises at its second end, a third transverse arm whose free end projects beyond the support arm, substantially as an extension of the latter, through an opening provided in this support arm, in the vicinity of the junction point of the latter with the securing arm.

BRIEF DESCRIPTION OF DRAWINGS

The accompanying drawings illustrate, by way of example, one embodiment of the fishing reel according to the present invention.

DESCRIPTION OF PREFERRED EMBODIMENT

Figure 1:
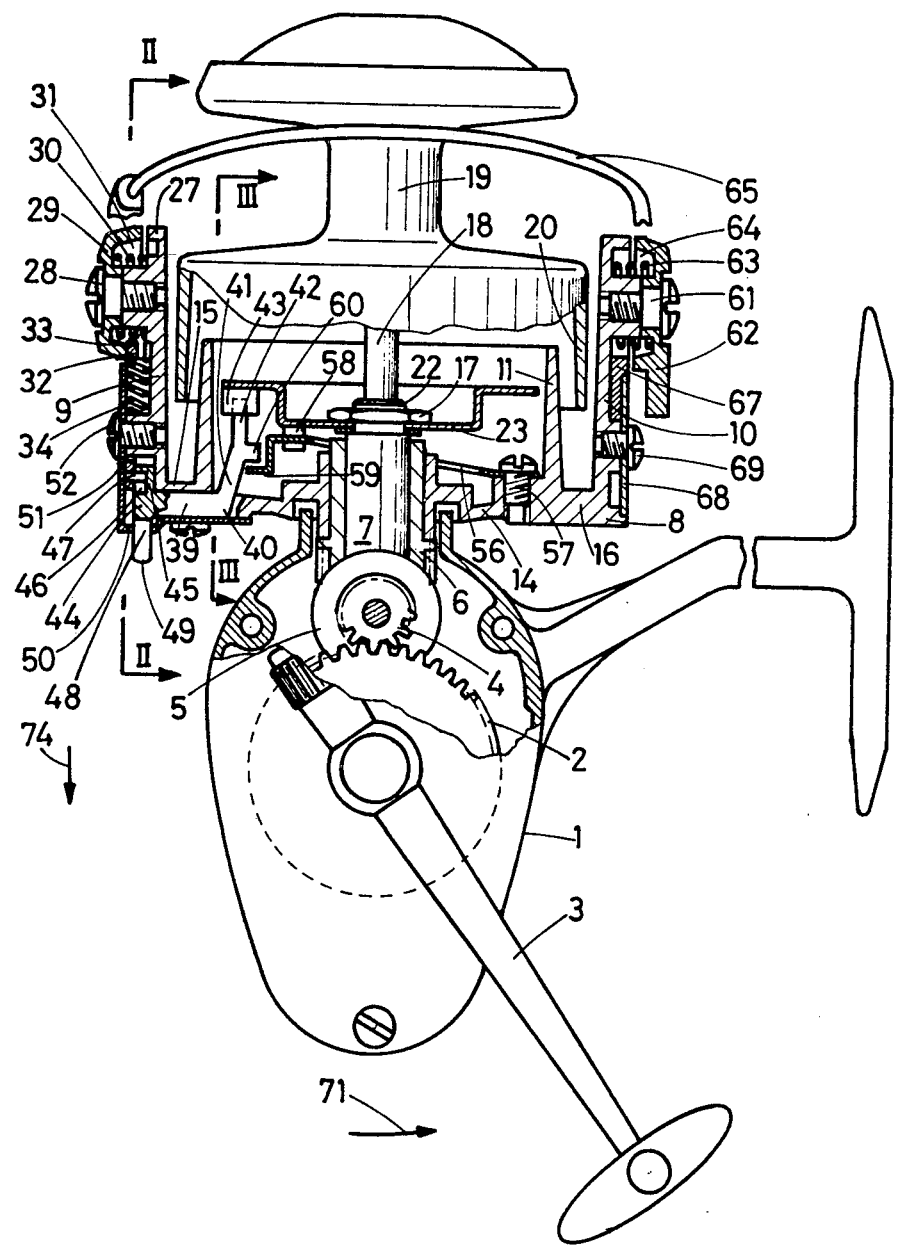
FIG. 1 is a partial longitudinal sectional view of this embodiment according to the invention, the pick-up being illustrated in the open position.
Figure 2:
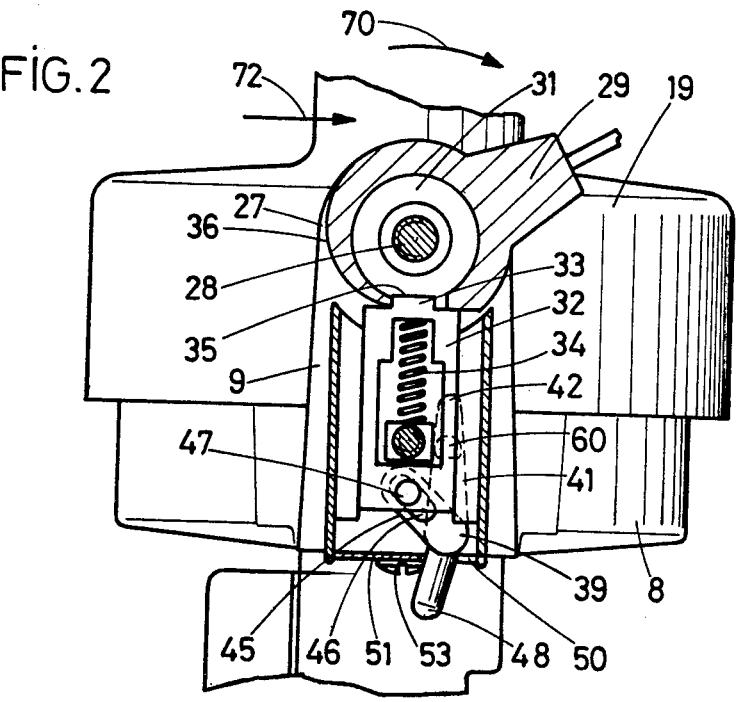
FIG. 2 is a sectional view on line II—II of FIG. 1 of the same embodiment.

As illustrated in particular in FIGS. 1 and 2, the fishing reel comprises a housing 1 in which is housed a gear wheel 2 connected to rotate with a crank 3. The gear wheel 2 is in mesh with a toothed pinion 4 connected to rotate with a second toothed pinion 5 which is itself in mesh with a third toothed pinion 6. The latter is mounted to rotate on a shaft 7 integral with the housing 1. A drum 8 is supported by the toothed pinion 6 with which it is integral. This drum 8 comprises two support arms 9 and 10 respectively, which are connected to the base 14 of the drum by securing arms 15 and 16 respectively, extending laterally from this base 14. The support arms 9 and 10 are thus located in the vicinity of the drum 8, along the latter, symmetrically respectively on either side of the periphery 11 of the drum 8. In this example, they are arranged parallel to the shaft 7 serving as the axis of rotation for the drum 8. In this example, the securing arms 15 and 16 are perpendicular to the axis of rotation of the drum 8. The free end of the shaft 7 comprises a screw-threaded part 22 on which a stationary washer 23 is fixed by a nut 17. The shaft 7 is tubular and serves as a bearing for a shaft 18 itself serving as a support for a spool 19 intended to receive the fishing line. This spool 19 comprises an outer skirt 20 surrounding the periphery 11 of the drum 8 and passing between this periphery 11 and the support arms 9 and 10. The shaft 18 and spool 19 are not able to rotate but are able to be moved axially by a mechanism which is not shown in the drawing and is located in the housing 1.

Figure 3:
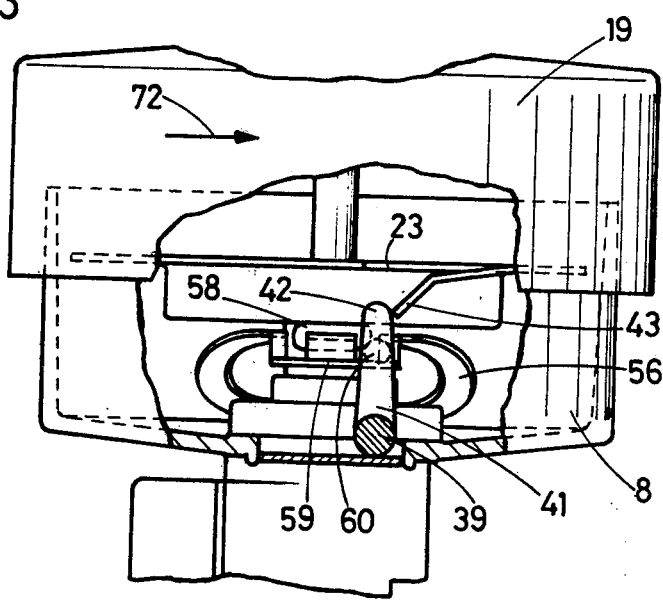
FIG. 3 is a sectional view on line III—III of FIG. 1 of the same embodiment.
Figure 4:
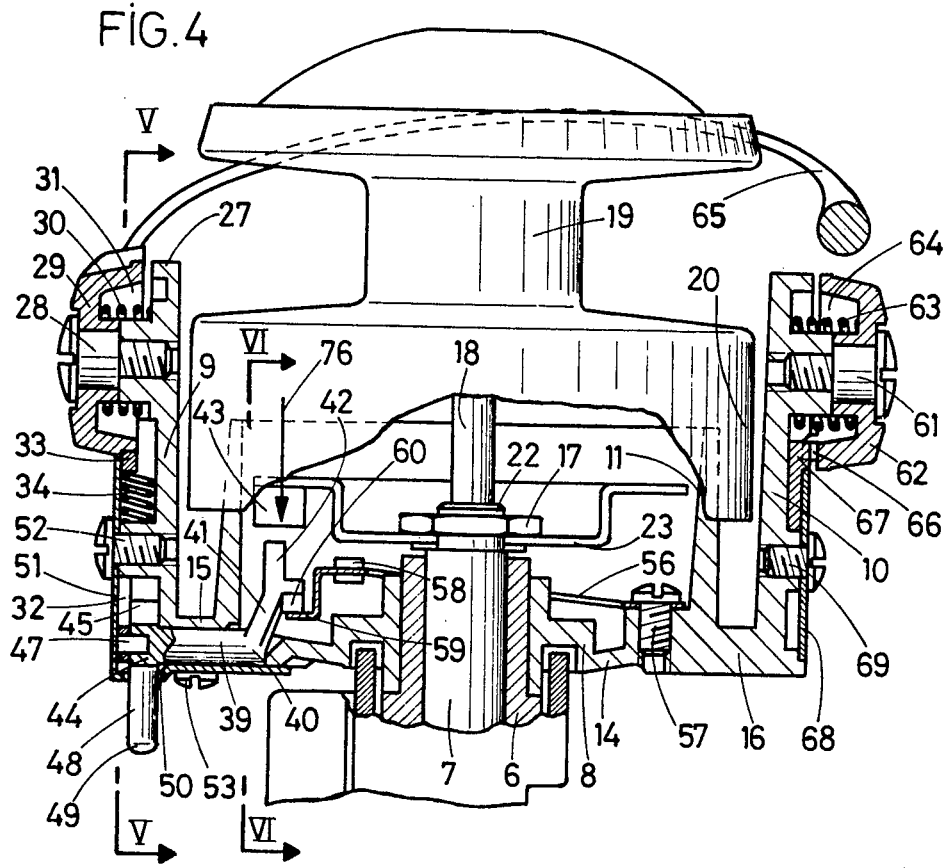
FIG. 4 shows the same embodiment, seen partly along a section similar to that of FIG. 1, the pick-up being shown in the closed position.
Figure 5:
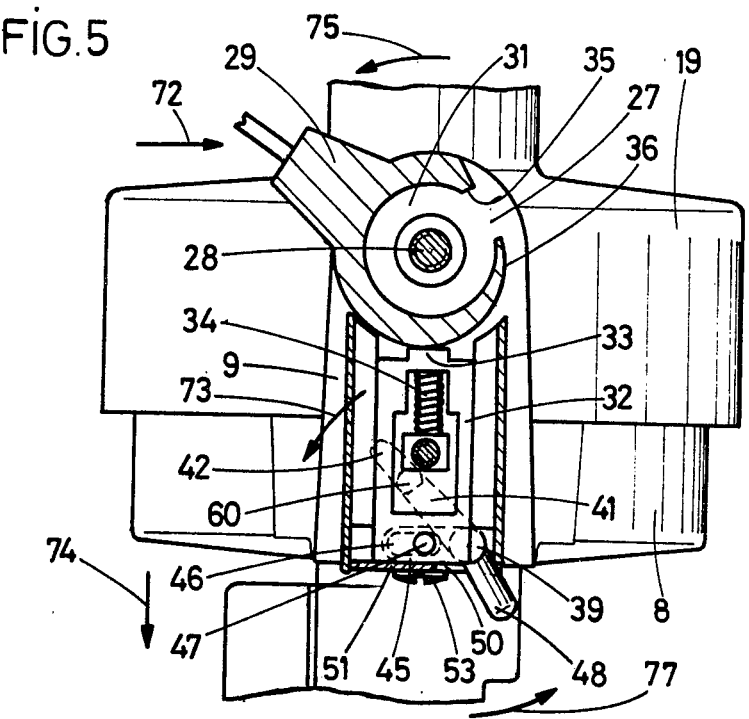
FIG. 5 shows the same embodiment in section on line V—V of FIG. 4.
Figure 6:
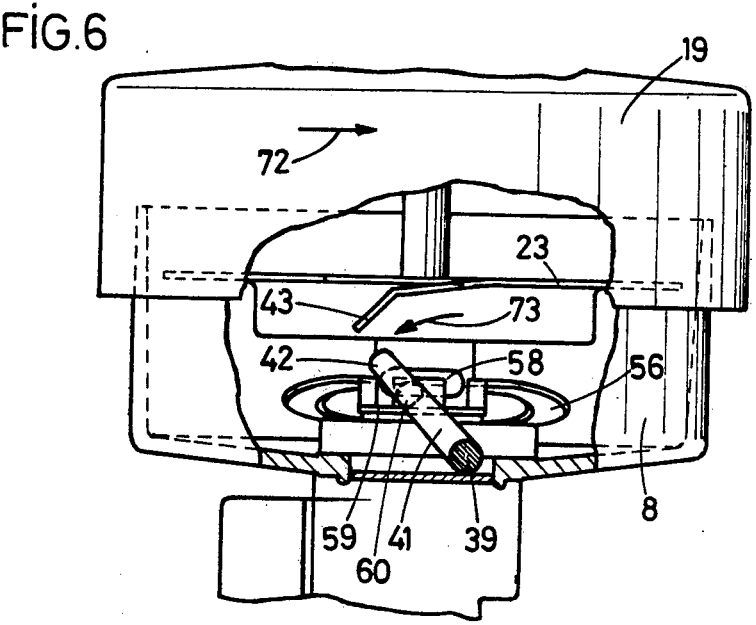
FIG. 6 shows the same embodiment in section on line VI—VI of FIG. 4.

As illustrated in FIGS. 1 to 6, the free end 27 of the support arm 9 supports a screw 28 serving as a pivot for a first pick-up arm 29 which under the action of a helical torsion spring 30 housed in a cylindrical recess 31, constantly tends to cause the latter to occupy a first "closed" angular position (FIGS. 4 to 6). The support arm 9 also supports an elastically yieldable locking device constituted by a sliding plunger 32 arranged longitudinally inside the support arm 9. Under the action of elastically yieldable means constituted for example by a helical compression spring 34, the end 33 of this plunger 32 constantly tends to be housed in a notch 35 in the periphery of the pick-up arm 29, when the latter occupies a second "open" angular position (FIGS. 1 to 3). The pick-up arm 29 comprises (FIGS. 2 and 5), on one side of the notch 35, a ramp 36 inclined in a direction such that it tends to cause the plunger 32 to withdraw, against the action of the spring 34, when the end 33 of this plunger 32 is disengaged from the notch 35 and the pick-up arm 29 passes from its second to its first angular position.

An unlocking device is housed in the securing arm 15, in the support arm 9 and inside the drum 8. It is constituted by a shaft 39 located in the securing arm 15 transversely with respect to the axis of rotation of the drum 8. This shaft 39 is able to move solely in an angular manner inside the securing arm 15. At a first end 40, inside the drum 8, it supports a first transverse arm 41 whereof the free end 42 is intended to co-operate with a fixed stop constituted by a bent tip 43 of the stationary washer 23. At its second end 44, opposite the first end 40, the shaft 39 supports a second transverse arm 45 comprising an oblong slot 46 arranged longitudinally in said second arm 45. A lug 47, integral with the sliding plunger 32, is housed in this slot 46. The second end 44 of the shaft 39 also optionally supports a third transverse arm 48 whose free end 49 projects beyond the support arm 9, substantially as an extension of the latter, through an opening 50 provided in a closure cover 51 keeping the shaft 39, the sliding plunger 32 and the spring 34 in place. Two screws 52 and 53 keep this cover 51 in place.

As illustrated in FIGS. 1-3-4-6, a drum brake is located inside the drum 8. It is constituted by a plate spring 56, in the shape of a ring, fixed at one end by a screw 57 screwed into the base 14 of the drum 8. The second end, opposite the first, of the plate spring 56 supports a rubber member 58 and comprises a bent part 59 intended to co-operate with an extension 60 provided laterally on the first transverse arm 41. The rubber member 58 is arranged in facing relationship to the stationary washer 23 with which it is able to come into contact, whatever the relative angular position of the stationary washer 23 and the drum 8.

As shown in FIGS. 1 and 4, at its free end, the support arm 10 supports a screw 61 serving as a pivot for a second pick-up arm 62, tending constantly, under the action of a helical torsion spring 63, housed in a cylindrical recess 64, to cause the latter to occupy a first "closed" angular position. The two pick-up arms 29 and 62, facing in the same direction, occupy their open or closed position at the same time. They are connected by a pick-up bar 65 which renders them one integral with the other. The first "open" angular position of the two pick-up arms 29 and 62 is determined by an extension 66 of the pick-up arm 62, which is thus in contact with an attached stop 67 of plastics material, provided on the support arm 10. A cover 68 retained by a screw 69, closes off the outer side part of the support arm 10, thus keeping the plastic stop 67 in place.

During the "casting" operation, the various parts occupy the position illustrated in FIGS. 1 to 3. The pick-up bar 65 has been moved manually in the direction of arrow 70 (FIG. 2) by the fisherman. The two pick-up arms 29 and 62 occupy their second "open" angular position. They are retained in this position by the end 33 of the sliding plunger 32, which is housed in the notch 35 in the pick-up arm 29. Inside the drum 8, the fixed stop 43 is in the trajectory of the free end 42 of the transverse arm 41 and the bent part 59 of the plate spring 56 is not in contact with the extension 60. The plate spring 56 is thus released and its rubber member 58 bears on the stationary washer 23. The drum 8 is thus prevented from rotating during the "casting" operation.

After the casting operation, the pick-up bar 65 must be brought into its first position (FIGS. 3 to 5), which makes it possible to restore the fishing line to the spool 19. For this, it is sufficient to rotate the crank 3 in the direction of arrow 71 (FIG. 1) and the drum 8 is thus rotated in the direction of arrow 72 (FIGS. 2-3-5 and 6). After one revolution of the drum 8 at the maximum, the end 42 of the transverse arm 41 of shaft 39 bears against the fixed stop 43 of the stationary washer 23 which causes arm 41 to pivot in the direction of arrow 73 (FIGS. 5 and 6). The second transverse arm 45 on the opposite end at shaft 39 pivots in the same direction, its slot 46 moving the lug 47 and the sliding plunger 32 in the direction of arrow 74 (FIG. 5) against the action of the spring 34. The end 33 of the plunger 32 leaves the notch 35. Instantaneously, the pick-up arms 29 and 62 rotate in the direction of arrow 75 (FIG. 5) under the action of their respective springs 30 and 63. The extension 66 of the pick-up arm 62 comes to bear against the stop 67. The pick-up arms 29 and 62 as well as the pick-up bar 65 thus occupy their first "closed" angular position (FIGS. 4 to 6). The ramp 36 keeps the sliding plunger 32 in the unlocked position and at the same time keeps the end 42 out of reach of the fixed stop 43. At the same time, the extension 60 moves the bent part 59 of the plate spring 56 in the direction of arrow 76 (FIG. 4). The rubber member 58 is thus moved away from the stationary washer 23 and the drum 8 is no longer prevented from rotating. All the parts thus occupy the position illustrated in FIGS. 4 to 6.

It will be noted that it is possible to achieve the same result without rotating the crank 3, if the reel, as in the described example, comprises a release device provided by the third transverse arm 48 on shaft 39. In fact, in this case, in order to release the pick-up and to move the latter from its second to its first position, it is sufficient to actuate the free end 49 of the transverse arm 48 manually in the direction of arrow 77 (FIG. 5). In the same way as previously, the action of the drum brake on the stationary washer 23 is eliminated.

When the return of the fishing line to the spool 19 is completed, before proceeding with a new casting operation, it is sufficient to move the pick-up bar 65 manually in the direction of arrow 70 (FIG. 2) and all the parts once more occupy the position illustrated in FIGS. 1 to 3. The pick-up bar 65 thus once more occupies its second "open" angular position.

Figure 7:
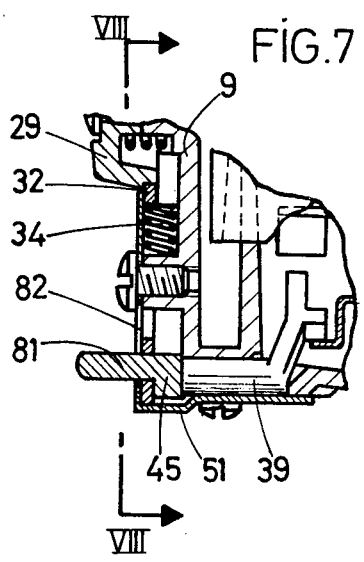
FIG. 7 shows a variation of the embodiment described in section on line VII—VII of FIG. 8.
Figure 8:
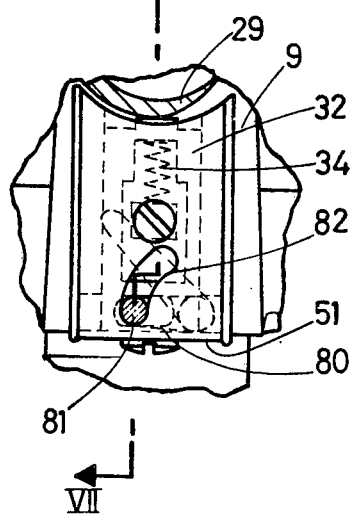
FIG. 8 shows the same variation in section on line VIII—VIII of FIG. 7.

FIGS. 7 and 8 show a variation of the preceding embodiment, in which the lug 47 is replaced, on the sliding plunger 32, by an oblong slot 80 arranged transversely with respect to the latter. On the other hand, the slot 46 in the second transverse arm 45 is replaced by a lug 81 which is housed in the slot 80. The operation of the assembly is similar to that of the embodiment described previously.

According to another variation, the third transverse arm 48 is eliminated, as is the slot 50. The lugs 47 or 81 provided, according to each individual case, on the sliding plunger 32 (FIGS. 1 and 2), or on the second transverse arm 45 (FIGS. 7 and 8) are extended axially and project laterally beyond the support arm 9 through an opening 82 provided in the cover 51 in this support arm 9. These extensions may thus be actuated manually in order to unlock the pick-up arm 29, without rotating the drum 8, in order to disengage the sliding plunger 32 from the notch 35.

Without diverging from the framework of the present invention, the fishing reel could comprise a single support arm. In fact, as will be ascertained, the locking device and unlocking device comprise few constituent parts and the latter, which take up little space, are housed in the single support arm 9. The support arm 10 could thus be eliminated, the corresponding end of the pick-up bar 65 for example being bent and pivoted directly to a rear part of the periphery 11 of the drum 8. This end could be pivoted for example at the location occupied by the securing arm 16.

The fishing reel which is the subject of the invention can be used in particular for spinning.

What is claimed is:

1. A fishing reel of the type comprising a spool which is not able to rotate and a drum mounted to rotate about the axis of the spool, a securing arm extending outwardly from a rear part of the periphery of said drum and a support arm extending forwardly from an outer end of said securing arm and spaced from the periphery of said drum, said spool having a rearwardly extending skirt that surrounds the periphery of said drum and passes between said drum and said support arm, a pick-up arm pivotally mounted on said support arm and angularly movable between a first "closed" angular position and a second "open" angular position, means elastically yieldably biasing said pick-up arm to its first "closed" position, and elastically yieldable locking and releasing means for releasably locking said pick-up arm in said second "open" position, said locking and releasing means comprising a plunger slidable longitudinally in said support arm and having a detent portion engageable in a notch in the periphery of said pick-up arm when said pick-up arm is in said second "open" position, means elastically yieldably biasing said plunger to said notch engaging position, an angularly movable shaft in said securing arm and arranged transversely of the axis of rotation of said drum, a transverse arm on the inner end of said shaft, a fixed stop engageable by said shaft arm upon rotation of said drum to move said shaft angularly, and means operatively connecting an outer end portion of said shaft with said plunger to withdraw said plunger from said notch and thereby free said pick-up arm for movement by its bias from said second "open" position to said first "closed" position upon angular movement of said shaft by engagement of said shaft arm with said fixed stop.

2. A fishing reel according to claim 1, in which said means operatively connecting said shaft with said plunger comprises a lug on said plunger, a second arm on the outer end of said shaft and having an oblong slot slidably receiving said lug and disposed at an angle to the longitudinal direction of said plunger whereby said second arm acts on said plunger to withdraw it from the notch in said pick-up arm upon angular movement of said shaft by engagement of said first mention shaft arm with said fixed stop.

3. A fishing reel according to claim 1, in which said means operatively connecting said shaft with said plunger comprises an oblong transverse slot in said plunger, a second arm on the outer end of said shaft and a lug on said second arm slidably received in said oblong shaft to withdraw said plunger from said notch in said pick-up arm upon angular movement of said shaft by engagement of said shaft arm with said fixed stop.

4. A fishing reel according to claim 1, further comprising means for angularly moving said shaft manually to release said pick-up arm without rotation of said drum.

5. A fishing reel according to claim 4, in which said means for angularly moving said shaft manually comprises a second transverse arm on said shaft and having a free end projecting externally for manual engagement to move said shaft angularly.

6. A fishing reel according to claim 1, in which said pick-up arm comprises on one side of said notch, a ramp inclined in a direction tending to cause said plunger to withdraw against the action of said biasing means when said plunger is disengaged from said notch and the pick-up arm moves by its bias from said second "open" position to said first "closed" position.

7. A fishing reel according to claim 6, comprising a stationary brake member, a spring plate carried by said drum and having a friction portion resiliently pressed against said brake member to brake rotation of said drum, said transverse drum on the inner end of said shaft having an extension engageable with said spring plate to disengage said friction portion from said brake member when said shaft is moved angularly.

8. A fishing reel according to any of claims 1 to 7, comprising a second support arm at the opposite side of said drum, a second securing arm connecting a rear end of said second support arm with the rear part of the periphery of said drum, a second pick-up arm pivotally mounted on said second support arm, means elastically yieldably biasing said second pick-up arm toward "closed" position and a pick-up bar connecting said pick-up arms to render them integral with one another.

* * * * *